United States Patent [19]

Habiger et al.

[11] 4,096,694

[45] Jun. 27, 1978

[54] CONTROL SYSTEM FOR A FLUID DRIVE

[75] Inventors: Cyril W. Habiger; Leon E. Hicks, both of Joliet, Ill.

[73] Assignee: Caterpillar Tractor Co., Peoria, Ill.

[21] Appl. No.: 813,029

[22] Filed: Jul. 5, 1977

[51] Int. Cl.² .................. F15B 15/18; F15B 11/16
[52] U.S. Cl. .............................. 60/459; 60/462;
60/486; 60/487; 60/445
[58] Field of Search ............. 60/445, 448, 452, 459,
60/462, 463, 487

[56] References Cited

U.S. PATENT DOCUMENTS

| | | | |
|---|---|---|---|
| 3,411,297 | 11/1968 | Hann | 60/389 |
| 3,768,263 | 10/1973 | Olson et al. | 60/425 |
| 3,972,186 | 8/1976 | Humphreys et al. | 60/425 |

*Primary Examiner*—Edgar W. Geoghegan
*Attorney, Agent, or Firm*—John W. Grant

[57] ABSTRACT

A fluid drive assembly has a pump, a variable displacement motor, a fluid circuit connecting the pump to the motor, and an actuator device for controlling the displacement of the motor. The actuator device is movable between a first position at which the displacement of the motor is at a preselected maximum and a second position at which the displacement of the motor is at a preselected minimum. A control system for the fluid drive assembly includes a source of fluid at a first preselected pressure value. A valve device is connected to the source of fluid and to the actuator device for controlling the fluid flow therebetween and is movable between a first position at which the source of fluid is in communication with the actuator device and a second position at which the source of fluid is blocked from communication with the actuator device. A first device automatically moves the valve device to the second position in response to the fluid pressure in the fluid circuit exceeding a second preselected pressure level. A second device retains the valve device in the first position until the fluid pressure in the fluid circuit decreases from the second preselected pressure level to a third preselected pressure level.

8 Claims, 4 Drawing Figures

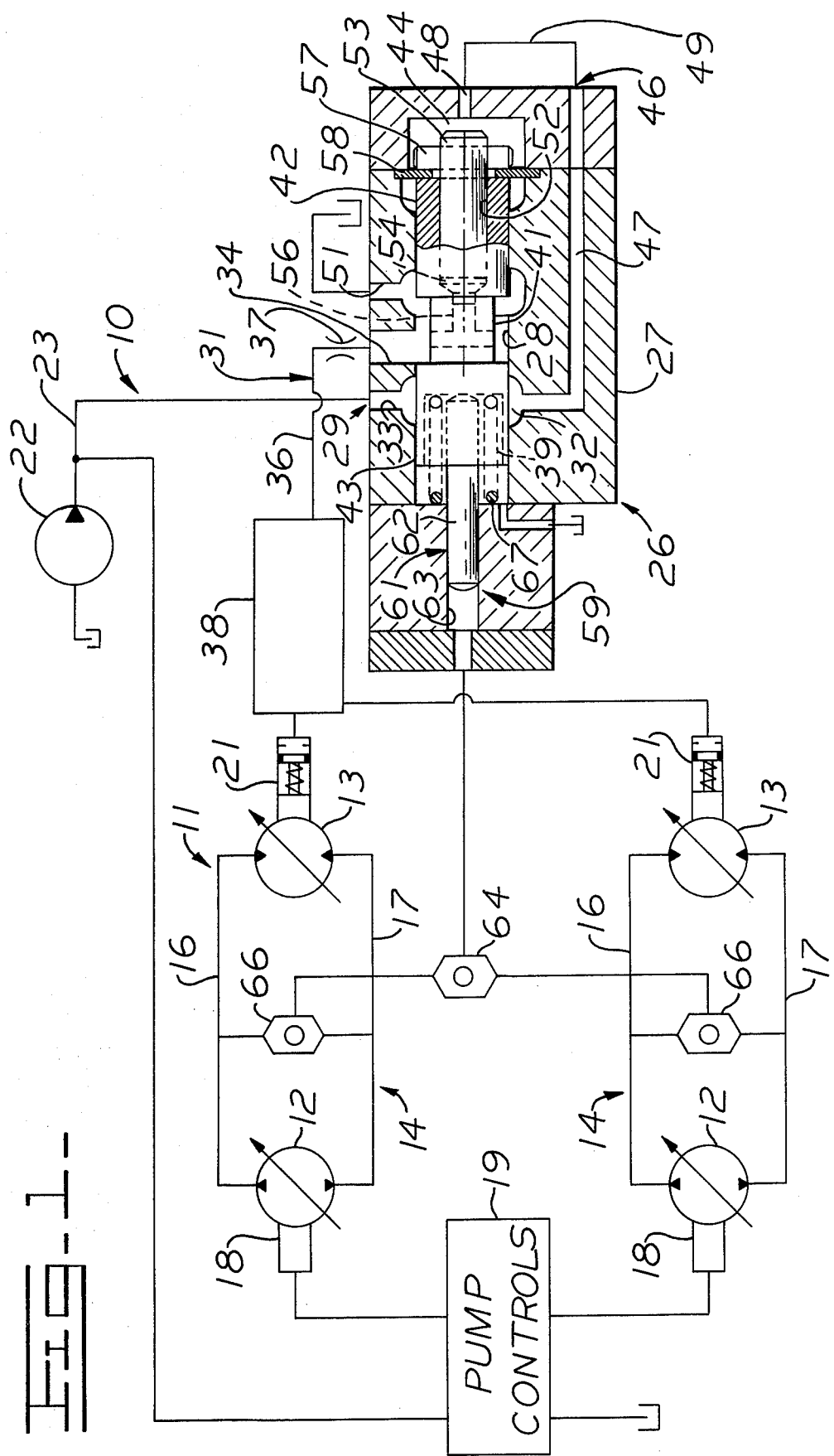

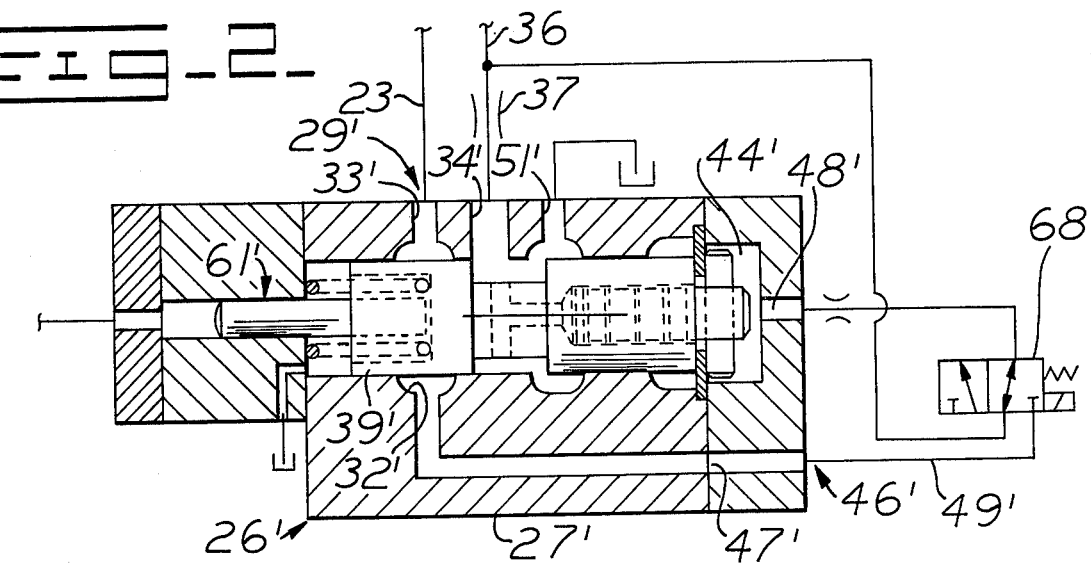
Fig-2-
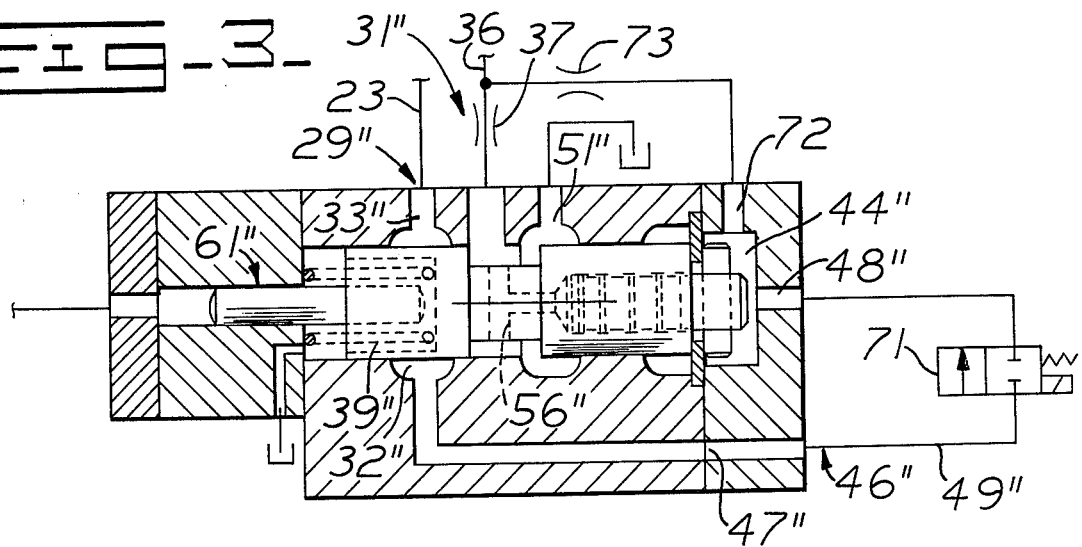
Fig-3-
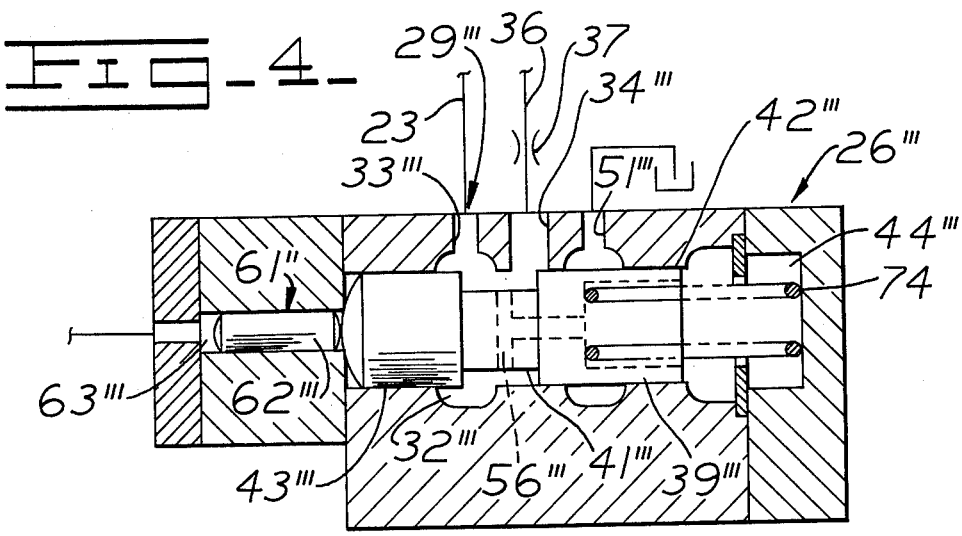
Fig-4-

CONTROL SYSTEM FOR A FLUID DRIVE

BACKGROUND OF THE INVENTION

Hydrostatic transmissions occasionally have a variable displacement motor or motors positionable at either minimum or maximum positions for fast and slow output speeds. One of the problems associated with such transmissions is that of providing a control system which automatically shifts the transmission to the slow speed when the output pressure of the pumps gets too high and prevents the transmission from being shifted from the slow speed to the fast speed when the output pressure is too high. Another problem is that once the transmission is shifted to the slow speed in response to a high output pressure of the pumps, the transmission should remain in the slow speed until the output pressure decreases to an intermediate pressure level. It is desirable under some conditions to provide manual control for selectively shifting the transmission to either the slow or fast speed with the control system capable of shifting the transmission to the slow speed automatically when the output pressure gets too high.

SUMMARY OF THE INVENTION

The present invention is directed to overcoming one or more of the problems as set forth above.

According to the present invention, a control system for a fluid drive assembly has a pump, variable displacement motor, a fluid circuit connecting the pump to the motor, and actuator means for controlling the displacement of the motor and movable between a first position at which the displacement of the motor is at a preselected maximum and a second position at which the displacement of the motor is at a preselected minimum. The control system includes a source of fluid at a first preselected pressure level. Valve means is connected to the source of fluid and to the actuator means for controlling fluid flow therebetween. A valve member is movable between a first position at which the source of fluid is blocked from communication with the actuator means and a second position at which the source of fluid is in communication with the actuator means. A first means automatically moves the valve member to the first position in response to the fluid pressure in the fluid circuit exceeding a second preselected pressure level. A second means retains the valve member in the first position until the fluid pressure in the fluid circuit decreases from the second preselected pressure level to a third preselected pressure level.

BRIEF DESCRIPTION OF THE DRAWINGS

FIG. 1 is a diagrammatic view of a control system of the present invention with portions shown in section for illustrative convenience; and FIGS. 2, 3 and 4 are alternate embodiments of the control system.

DETAILED DESCRIPTION

Referring to FIG. 1, a control system 10 for a fluid drive assembly such as a hydrostatic transmission 11, has a pair of variable displacement overcenter pumps 12 and a pair of variable displacement two-speed motors 13. Each of the pumps is connected to one of the motors through a fluid circuit 14 including a pair of conduits 16, 17. Each of the pumps has an actuating means 18 connected to a pump control means 19 for controlling the displacement of the pumps. Each of the motors has an actuator means 21 for controlling the displacement of the motor. The actuator means 21 is movable between a first position at which the displacement of the motor is at preselected maximum and a second position at which the displacement of the motor is at a preselected minimum. With the motor at its maximum displacement position, the motor is operated at its slow speed and when the motor is at its minimum displacement position, it operates at its fast speed.

A source of fluid such as a pump 22, draws fluid from a tank and delivers fluid through a conduit 23 to the pump control means 19 which maintains the pressure in the conduit 23 at a first preselected pressure level, for example approximately 350 psi. The pump 22 is independent of the pumps 12.

A valve means 26 includes a multi-part body 27 having a bore 28 therein. A first passage means 29 connects the bore with the conduit 23 and a second passage means 31 connects the bore to the actuator means 21. The first passage means 29 can include an annulus 32, a port 33 and the conduit 23. The second passage means 31 can include a port 34, a conduit 36, an orifice 37 positioned in the conduit 36 and a means 38 positioned within the conduit for dividing the fluid flow substantially equally between the actuator means 21 of the motors 13.

A valve member 39 is slidably positioned in the bore 28 and has an annular groove 41 positioned intermediate first and second end portions 42, 43. A chamber 44 is formed in the body at the first end portion 42 of the valve member and is connected to the annulus 32 of the first passage means 29 through a third passage means 46 which includes ports 47, 48 and a connecting line 49. Preferably, the third passage means is formed by suitable passages within the body.

The valve member 39 is movable between first and second positions. At the first position, the annulus 32 of the first passage means 29 is blocked from communication with the port 34 of the second passage means 31 and the port 34 is in communication with a drain port 51 through the annular groove 41. At the second position, the port 33 of the first passage means 29 is in communication with the port 34 of the second passage means 31 through the annular groove 41 and port 34 is blocked from communication with the drain port 51.

A bore 52 in the first end portion 42 of the valve member 39 slidably receives a slug 53 defining a chamber 54 at the inner end thereof. A passageway 56 in the valve member connects the chamber 54 with the annular groove 41. A stop member or pin 57 extends through an aperture in the slug. Another stop member or washer 58 is suitably fixed to the body and positioned in the pathway of the end portion 42 of valve member 39 for stopping movement thereof at the first position and positioned in the pathway of the pin 57 for stopping movement of the slug 53 as the valve member 39 is moved to its second position.

A means 59 is connected to valve member 39 for automatically moving the valve member to the first position in response to the fluid pressure in one of the conduits 16, 17 exceeding a second preselected pressure level. Means 59 can be a piston means 61 having a piston 62 slidably positioned within a chamber 63 and having one end in abutment with the second end portion 43 of valve member 39. The chamber 63 is connected to a ball resolver 64 which in turn is connected to a pair of ball resolvers 66. Each of the ball resolvers 66 are positioned between respective pairs of conduits 16, 17 in a manner that the highest pressure in any of the conduits is transmitted to chamber 63.

A spring 67 is positioned at the second end portion 43 for urging the valve member 39 toward its first position.

Referring now to FIG. 2, another embodiment preferably has a two-position, three-way solenoid acutated valve 68 positioned within the line 49' of the third passage means 46' between ports 47', 48' and is connected to conduit 36 between the orifice 37 and means 38, FIG. 1. The valve 68 is movable between a first position at which chamber 44' is in communication with the conduit 36 and port 47' is blocked from communication with port 48' and a second position at which port 47' is in communication with port 48' and port 48' is blocked from communication with the conduit 36. Alternatively, the valve 68 can be of a type which is manually or fluid actuated.

Referring to FIG. 3, another embodiment preferably has a two-position, two-way solenoid actuated valve 71 positioned within the line 49" between ports 47" and 48". A port 72 connects the chamber 44" with the conduit 36 through an orifice 73. The valve 71 is movable between a first position at which fluid flow through the line 49 is blocked and a second position at which fluid can flow through the line 49" from port 47" to port 48".

Referring now to FIG. 4, another embodiment of the valve means 26'" has a spring 74 positioned within the chamber 44'" for urging the valve member 39'" to the second position. A passageway 56'" connects the annular groove 41'" directly with the chamber 44'".

In the operation of the embodiment of FIG. 1, when there is no fluid pressure in conduit 23, such as when the pump 22 is not being driven, the spring 67 will bias the valve member 39 to the first position shown. When the pump 22 is driven, such as when the vehicle engine is started and fluid pressure builds up in the conduit 23 to the first preselected pressure level, fluid flows through port 33, annulus 32, port 47, line 49, port 48 and into the chamber 44. Since at start up of the engine there is no fluid pressure in the conduits 16, 17 and hence no fluid pressure in the chamber 63, the fluid pressure in chamber 44 acting against the end of the valve member 39 overcomes the bias of spring 67 and moves the valve member to the left to the second position. This force urging the valve member to the second position is applied continuously while the pump 22 is running. At this position of the valve member, fluid is delivered to the actuator means 21 of the motors 13 for moving the motors to their second position. Likewise, at this position of the valve member 39, fluid flows through passageway 56 into chamber 54 thereby adding an additional force urging the valve member to the second position.

When the fluid pressure in any one of the conduits 16, 17 exceeds a second preselected pressure level, for example approximately 4000 psi, the fluid pressure in the chamber 63 acting on the piston 62 is sufficient to overcome the force exerted on the valve member 39 by the fluid pressure in chambers 44, 54 and moves the valve member 39 to the right to its first position. At this position, communication between ports 33, 34 is blocked and port 34 is connected with the drain port 51 with the net result being that the actuating means 21 are moved to their second position at which the displacement of the motors is at maximum for obtaining slow speed.

At the first position of the valve member 39, the chamber 54 is also vented to the drain port 51 thereby removing a portion of the biasing force urging the valve member toward its second position. Thus, the valve member is retained in the first position until the highest fluid pressure in the conduits 16, 17 decreases to below a third preselected pressure level, for example approximately 2100 psi. With the fluid pressure in the conduit 16 or 17 and thus chamber 63 below the third preselected pressure level, the force of the fluid pressure in chamber 44 acting on the end of the valve member 39 is sufficient to move the valve member 39 back to its second position.

The operation of the embodiment of FIG. 2 is similar to that described above with the exception that the solenoid valve 68 in its first position shown blocks fluid flow through the line 49' of the third passage means 46' to the chamber 44' and connects chamber 44' to the drain port 51'. Thus, upon start up of the engine, the valve member 39' will remain at the first position so that the motors 13 remain at their maximum displacement position.

Shifting the solenoid valve 68 to its second position passes fluid through line 49' to the chamber 44'. The force generated by the pressurized fluid in chamber 44' against the end of the valve membe 39' moves the valve member 39' to its second position. However, once the valve member is moved to its second position, shifting the solenoid valve 68 back to its first position will not cause valve member 39' to be shifted back to its first position since chamber 44' is connected to the conduit 36 through the valve 68. Thus, the valve member 39' will remain in the second position until it is moved to the first position in response to the fluid pressure in any one of the conduits 16, 17 exceeding the second preselected pressure level or in response to stopping the pump 22 such as when the engine is stopped.

The operation of the embodiment of FIG. 3 is similar to that described above in conjunction with FIG. 2 in that the valve member 39" will remain in the first position at the first position of the solenoid valve 71 due to the solenoid valve blocking fluid flow through the line 49" from annulus 32" to the chamber 44". Shifting the solenoid valve 71 to its second position passes fluid through the line 49" to chamber 44" thereby moving the valve member 39" to its second position. However, at the second position of the valve member, since the chamber 44" is connected to the conduit 36 through the port 72 and orifice 73, the valve member 39" will remain in its second position even through the solenoid valve 71 is shifted back to its first position. As with the first two embodiments, the valve member 39" will be shifted to its first position in response to the fluid pressure in any one of the conduits 16, 17 exceeding the second preselected pressure level.

In the operation of the embodiment of FIG. 4, the valve member 39'" is normally biased to the second position shown in the drawings by the spring 74. Thus, at start up, the valve member 39'" is already in the second position. At the second position of the valve member 39", pressurized fluid from the conduit 23 passes through the passageway 56'" into the chamber 44'" thereby adding to the force urging the valve member 39'" to the left or second position.

When the fluid pressure in any one of the conduits 16, 17 exceeds the second preselected pressure level, the valve member 39'" is shifted automatically to the first position. At the first position of the valve member, communication between the annulus 32'" and the passageway 56'" is blocked and the chamber 44'" is vented to the drain port 51'". Thus, the force of piston 62'" on the valve member will retain the valve member at the first position until the highest fluid pressure in the conduits 16, 17 decreases to the third preselected pressure level. With the fluid pressure in the chamber 63''' below the third preselected pressure level, the force of the spring 74 is sufficient to overcome the force of the piston and moves the valve member back to its second position.

Other aspects, objects and advantages of this invention can be obtained from a study of the drawings, the disclosure and the appended claims.

The embodiments of the invention in which an exclusive property or privilege is claimed are defined as follows:

1. A control system for a fluid drive assembly comprising:
  a pump;
  a variable displacement two-speed motor having actuator means for controlling the displacement of the motor, said actuator means being movable between a first position at which the displacement of the motor is at a preselected maximum and a second position at which the displacement of the motor is at a preselected minimum;
  a fluid circuit connecting the pump to the motor;
  a source of fluid at a first preselected pressure level;
  valve means connected to the source of fluid and to the actuator means for controlling fluid flow therebetween, said valve means having a valve member movable between a first position at which the source of fluid is blocked from communication with the actuator means and a second position at which the source of fluid is in communication with the actuator means;
  first means for controllably automatically moving the valve member to the first position in response to the fluid pressure in the fluid circuit exceeding a second preselected level;
  second means for retaining the valve member in the first position until the fluid pressure in the fluid circuit decreases from the second preselected pressure level to a third preselected pressure level.

2. The control system of claim 1 wherein said second means includes third means for continuously urging the valve member toward the second position and fourth means for applying a force to the valve member in a direction urging the valve member toward the second position only when the valve member is in said second position.

3. The control system of claim 2 wherein said valve member has first and second end portions, said third means includes a first chamber at the first end portion of said valve member, said first chamber being connected to the source of fluid, and said fourth means includes an annular groove in the valve member intermediate the first and second end portions, a bore in the first end portion of the valve member, a slug slidably positioned within the first bore and extending into the first chamber, a second chamber at the inner end of the second bore, a passageway connecting the annular groove with the second chamber, said annular groove being at a location sufficient for communicating the source of fluid with the passageway and actuator means at the second position of the valve member and for communicating the actuator means and passageway with a drain means at the first position of the valve member.

4. The control system of claim 3 including a first stop member connected to the slug, a second stop member positioned in the pathway of the valve member for limiting movement of the valve member at the first position and in the pathway of the first stop member for limiting movement of the slug in response to the valve member being moved to the first position.

5. The control system of claim 3 including a valve connected to the source of fluid, the actuator means, and to the first chamber, said valve being movable between a first position at which the first chamber is blocked from communication with the source of fluid and is in communication with the actuator means and a second position at which the first chamber is blocked from communication with the actuator means and is in communication with the source of fluid.

6. The control system of claim 3 including a valve connected to the source of fluid and to the first chamber and being movable between a first position at which the source of fluid is blocked from communication with the first chamber and a second position at which the source of fluid is in communication with the first chamber.

7. The control system of claim 2 wherein said third means includes a spring, said fourth means includes a first chamber at one end of the valve member, an annular groove in the valve member, a passageway in the valve member connecting the annular groove with the first chamber, said annular groove being positioned at a location sufficient for communicating the source of fluid with the passageway and the actuator means at the second position of the valve member and for communicating the passageway and the actuator means with a drain means at the first position of the valve member.

8. The control system of claim 2 wherein said first means includes a piston and a first chamber, said first chamber being connected to said fluid circuit and said piston being positioned to cause movement of the valve member toward the first position.

* * * * *